United States Patent [19]
Pawlowski

[11] Patent Number: 5,829,507
[45] Date of Patent: Nov. 3, 1998

[54] STICK-ON LIGHT SHADE

[76] Inventor: Mark Pawlowski, 7456 W. Rosedale, Chicago, Ill. 60631

[21] Appl. No.: 783,499

[22] Filed: Jan. 14, 1997

[51] Int. Cl.$^6$ ..................................................... A47H 13/00
[52] U.S. Cl. ................................. 160/368.1; 161/370.21; 296/97.7
[58] Field of Search ........................... 160/368.1, 370.21, 160/DIG. 2, DIG. 3; 296/97.7

[56] References Cited

U.S. PATENT DOCUMENTS

| 3,411,562 | 11/1968 | Garrett | 160/370.21 X |
|---|---|---|---|
| 3,511,365 | 5/1970 | Dow | 296/97.7 X |
| 3,868,293 | 2/1975 | Selph | 296/97.7 X |
| 3,964,780 | 6/1976 | Naidu | 160/370.21 X |
| 4,353,593 | 10/1982 | Henson . | |
| 4,749,222 | 6/1988 | Idland . | |
| 4,811,982 | 3/1989 | Carlyle | 296/97.7 X |
| 4,862,944 | 9/1989 | Hendershot | 160/370.21 |
| 5,002,326 | 3/1991 | Westfield et al. | 160/370.21 X |
| 5,024,262 | 6/1991 | Huang | 160/370.21 X |
| 5,064,239 | 11/1991 | Folcik | 160/370.21 X |
| 5,622,215 | 4/1997 | Lien | 160/370.21 |

OTHER PUBLICATIONS

Sun–Out™ Visor, date unknown.
No–Gate Visor Extender, date unknown.
Sunburst™ Personal–Size Sunshades, 1995.
Dark Tint Window Shade by Auto–Shade, 1995.
Gila Sunshine Window Film, 1992.
Sun–Spot Glare Reducer by Autoshade™, 1995.
Static Images, date unknown.
Super Signs, Inc.. Press On, Peel Off Window Decorations, date unknown.
Dual sun visors with a plastic slipout visor, Cartalk, date unknown.
Dahm's™ Instant–Tint™, date unknown.

Primary Examiner—Blair Johnson
Attorney, Agent, or Firm—Hill & Simpson

[57] ABSTRACT

A stick-on light shade for selectively reducing the transmission of light through a selected portion of a window is disclosed. The light shade comprises a flexible polymeric film being substantially homogeneously tinted to uniformly reduce the transmission of light therethrough. The light shade also includes a mechanism for temporarily and releasably adhering the light shade to a selected portion of the window. In use, the light shade may be easily pressed onto a selected portion of a window to reduce transmission of light from sources such as the sun, snow glare, headlights, etc. The adhering mechanism may take the form of a suitable adhesive disposed on the flexible film or static adhesion characteristics of the flexible film itself. In one embodiment, the light shades are provided in a pad having a plurality of individual light shades.

22 Claims, 1 Drawing Sheet

U.S. Patent      Nov. 3, 1998      5,829,507
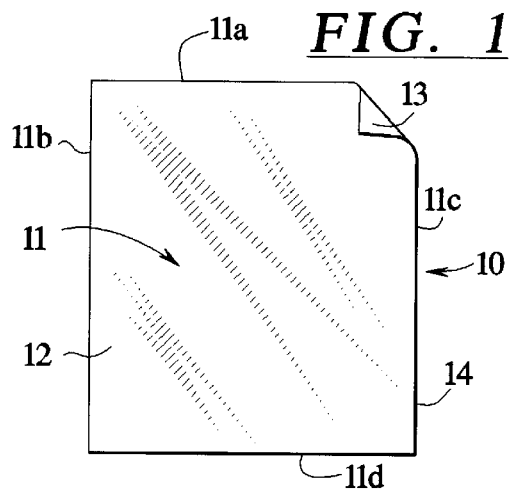
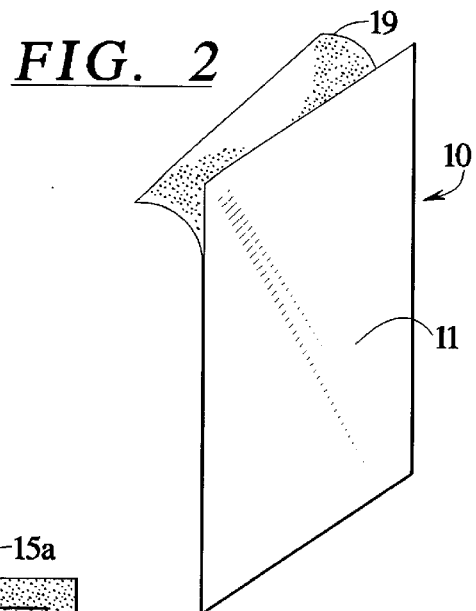
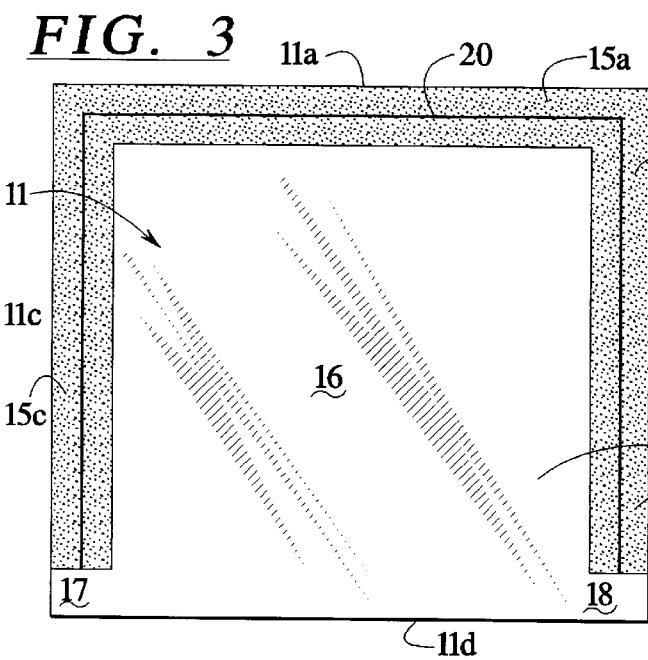
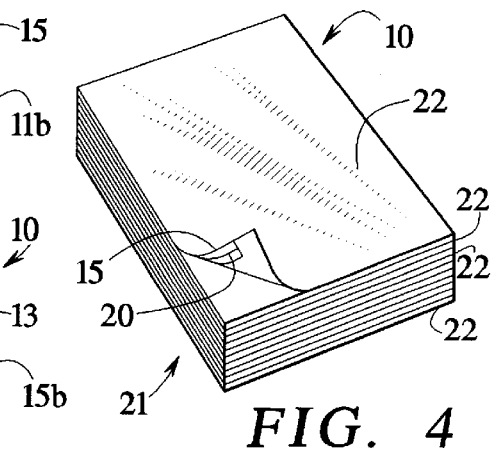
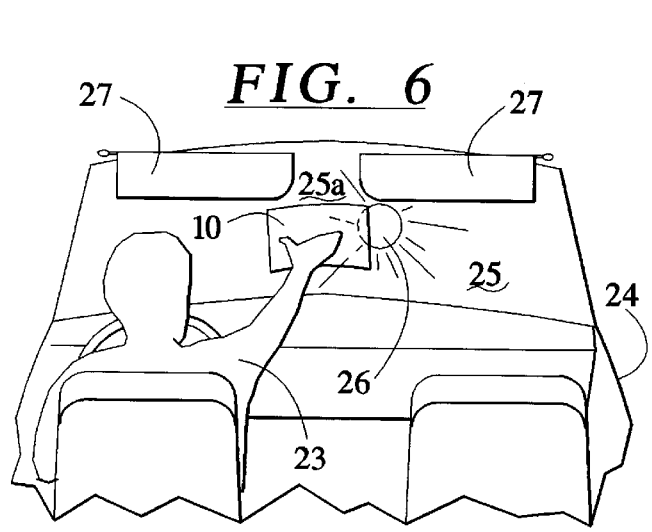
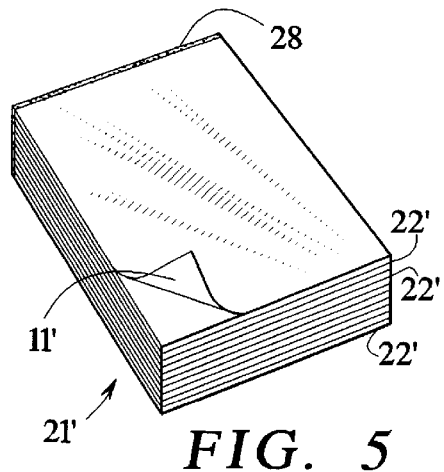

STICK-ON LIGHT SHADE

BACKGROUND

This invention relates to sun and light shades for reducing the transmission of light through windows into the interior of vehicles such as automobiles, trucks, buses, airplanes, boats and the like. This invention can also be used on other windows such as in buildings, etc. More particularly, this invention relates to a stick-on light shade that can be temporarily and releasably adhered to a selected portion of a window to reduce transmission of light through that selected window portion.

Many products are on the market for reducing the transmission of light through windows into the interior of vehicles. Commonly, many automobile manufacturers tint automobile windows at the factory if selected as an option by a consumer. Consumers may also have the windows of automobiles or other vehicles professionally tinted at a later date. However, factory and professional tinting of windows are expensive, permanent and typically cover the entire window. In certain weather conditions, the permanent tinting of the entire window can be undesirable because it reduces the driver's ability to see clearly through the window.

In addition to factory and professional installation of tinted windows, many kits are commercially available for permitting consumers to tint windows at home. Typically, such kits include strips of tinted film that are applied by wetting the window, applying the film to the window, squeegeing the film flat, and then trimming the film to size. While home application of tinted films is less expensive than factory or professional installation, the process of installing the tinted film is rather complex and difficult. For example, removing air bubbles, puckers and wrinkles from the film on the windows is extremely difficult and improper application of the film is unsightly and hinders the driver's vision.

Many opaque shades and screens are also commercially available and have increased in popularity in recent years. Commonly, such shades or screens are used to shield children or infants from the sun while riding in automobiles. Such shades and screens typically comprise an almost opaque sheet or screen of fabric and is typically attached to the window by suction cups. The purpose of the opaque sheet or fabric is to completely or substantially block transmission of light, such as from the sun. While such shades or screens are effective in blocking light, the opaque nature of such screens obstructs the view of the driver and are thus dangerous while driving.

SUMMARY OF THE INVENTION

An important aspect of this invention therefore lies in providing a temporary stick-on light shade that can be easily attached and removed from a window surface to reduce light transmission through selected areas of a window of a vehicle or other area. The stick-on light shade can be provided in variety of sizes and shapes, and the user can simply press the stick-on light shade in the selected portion of the window to reduce unwanted glare from the sun, snow, headlights and the like. The light shades can also be used to control the temperature in the vehicle or room, etc. Advantageously, the stick-on light shades of this invention are inexpensive and may be adapted for temporary use and then disposal. Accordingly, consumers may keep a number of the light shades in their vehicle and selectively use and discard them as needed.

The foregoing objectives are achieved by providing a light shade comprising a substantially non-opaque flexible polymeric film having top and bottom surfaces and a peripheral edge. The polymeric film has a size and shape adapted for being used on selected portions of windows on the interior of a vehicle. For example, the flexible film may have a quadrangle shape and may have dimensions of, for example, six inches by six inches to ten inches by ten inches. The flexible film is substantially homogeneously tinted to uniformly reduce transmission of light therethrough while still permitting the driver of the vehicle to look through the film so that the driver's view is not obstructed.

The light shade is provided with stick-on means for temporarily and releasably adhering the flexible film to a selected portion of a window. The stick-on means also permits easy removal and selected reattachment of the flexible film to a window surface for one or more uses. The inexpensive nature of the stick-on light shade then allows for it to be disposed after one or a few uses.

In one embodiment, the stick-on means comprises an adhesive that extends along a portion of the peripheral edge of the flexible film. The flexible film comprises a quadrangle having four sides with the adhesive extending completely along one side of the film and also partially extending along two other sides of the film. Such an adhesive pattern defines a U-shaped area of adhesive around the peripheral of the film so that the three edges are securable to a window's surface. However, the adhesive free edge and the two sides that are only partially covered with the adhesive permit easy lifting of one side of the flexible film for easy removal of the flexible film from a window surface.

The adhesive may be selected from a number of commercially available adhesives. However, the adhesive preferably has a stronger affinity for the flexible film than for typical windows. Such adhesives will remain on the flexible film after removal from the window such that substantially no adhesive residue is left on the window after removal.

In another embodiment, the stick-on means comprises the flexible film itself which is selected to have static adhesion properties sufficient to temporarily and releasably adhere the film to a window surface. In order to achieve such results, the flexible film is preferably comprised of a film having electrostatic properties that will adhere the lightweight film to a window. For example, the flexible film may comprise an ethyl-enically unsaturated monomer such as polyvinyl alcohol and polyvinyl chloride, but to name a few preferred materials.

In an embodiment, the light shade is provided with stiffening means for resiliently maintaining the flexible film in a substantially planar condition while still allowing the film to conform to the shape of the window surface. The stiffening means may comprise a resilient wire extending along at least a portion of the peripheral edge of the flexible film. The resilient wire may take a U-shaped configuration in order to match the U-shape of the adhesive.

Another aspect of this invention lies in providing a pad of stick-on light shades. The pad comprises a plurality of sheets of substantially non-opaque flexible polymeric film successively stacked together to form the pad. Each of the sheets includes tinting means for uniformly reducing the transmission of light through each of the sheets. As previously described, the sheets are each provided with stick-on means interposed between each of the successive sheets for temporarily and releasably adhering the sheets together on the pad and also for temporarily and releasably adhering the sheet, once removed from the pad to a selected portion of a window.

Another aspect of this invention lies in providing a method for temporarily tinting a selected portion of a window to reduce the transmission of light through that selected portion of the window. The method comprises the steps of providing a window, identifying a selected portion of the window for tinting, obtaining a sheet of flexible polymeric film of the light shade of this invention, and then pressing the polymeric film to the selected portion of the window. The polymeric film is held on to the window by the stick-on means and may be easily removed for selective reattachment to another part of a window or for disposal.

Other objects, advantages, and features of the present invention will become apparent from the following description and drawings.

BRIEF DESCRIPTION OF THE DRAWINGS

FIG. 1 is a top plan view of the stick-on light shade of the present invention.

FIG. 2 is a perspective view of the stick-on light shade of the present invention.

FIG. 3 is a bottom plan view of the stick-on light shade of the present invention.

FIG. 4 is a perspective view of a pad of individual stick-on light shades of the present invention.

FIG. 5 is a perspective view of a pad of stick-on light shades comprising an alternate embodiment of the present invention.

FIG. 6 is a perspective view illustrating use of a stick-on light shade of the present invention to reduce the transmission of light into the interior of a vehicle at a selected portion of a windshield.

DETAILED DESCRIPTION OF THE PREFERRED EMBODIMENTS

Referring to FIGS. 1–3, the numeral 10 generally designates one embodiment of the stick-on light shade of the present invention. Shade 10 is comprised of a substantially non-opaque flexible polymeric film 11 having a top surface 12, a bottom surface 13 and a peripheral edge 14. Flexible film 11 is illustrated generally in the shape of a quadrangle having four linear sides 11a–11d. However, it will be understood that the size and shape of flexible film 11 may vary considerably depending upon a particular application for which the stick-on light shade is intended.

Flexible film 11 is preferably comprised of any one of a number of commercially available optical grade window films which are substantially non-opaque but reduce the transmission of light and ultraviolet rays through the film. In order to accomplish such results, flexible film 11 is preferably formed of a thermoplastic polymeric film which is substantially homogeneously tinted to uniformly reduce the transmission of light therethrough. It is believed that flexible optical grade films that permit about 20% to 50% light transmission therethrough are suitable with the present invention. However, the optical film may have other suitable degrees of light transmission and may have different color tints such as light smoke, dark smoke, pearl gray, etc. (In most instances, the flexible film should be non-reflective but the film may also be reflective for certain uses, such as when the shade is used to reduce heat build-up on the inside of a vehicle from the sun). One example of suitable optical grade window film having a light transmission of about 35% and being usable in the embodiment shown in FIGS. 1–4 is commercially available from Courtaulds Performance Films, Inc. of Martinsville, Va. However, other suitable optical grade window films are well known in the industry and may also be used in practicing the present invention.

Light shade 10 includes stick-on means for temporarily and releasably adhering the flexible film 11 to a selected portion of a window and permitting easy removal and selective reattachment of the film 11 to a window. In the embodiment shown in FIGS. 1–4, such means take the form of an adhesive 15 that extends along at least a portion of the peripheral edge 14 of the flexible film 11. Preferably, the adhesive 15 extends completely along one edge 11a of the film and partially along the adjacent two edges 11b and 11c of the film. The adhesive band 15b and 15c that extends along edges 11b and 11c are generally parallel to each other and are generally perpendicular to the adhesive band 15a extending along edge 11a. The adhesive bands 15a–15c form a U-shaped adhesive pattern defining a central adhesive-free zone 16 and adhesive-free edge portions 17 and 18. In use, the three adhesive bands 15a–15c maintain the adhesive film 11 in a planar condition against a window surface. However, the adhesive free end portions 17 and 18 permit a user to lift one end of the film 11 to facilitate removal of film 11 from a window, and adhesive free zone 16 ensures that the force required in order to remove film 11 from the window is minimal. While FIG. 3 illustrates a preferred patterns for the adhesive 15 on the bottom surface 13 of light shade 10, it will be understood that other adhesive pattern may be used in accordance with the present invention.

Adhesive 15 preferably has a greater affinity for the flexible film 11 than for conventional windows found in the interior of vehicles such as automobiles, boats and airplanes. Such adhesive will remain on the flexible film 11 and will not leave an undesirable adhesive residue on the window's surface once removed therefrom. The adhesive used is preferably of the type that does not need to be wet in order to cause the flexible film to stick to a window. It is preferable that the adhesive is of the type that, if it becomes wet, does not cause the flexible film to permanently stick to a window. It is believed that one suitable adhesive is available from 3M of Minneapolis, Minn. and is of the type commonly used in removable adhesive notes, such as notes sold under the trademark POST-IT and HIGHLAND by 3M. While it is believed that such adhesives are preferable, it is believed that other adhesives would be suitable and that the degree of tackiness of the adhesive may vary depending upon the particular application for which the stick-on light shade 10 is intended. For example, the stick-on light shade 10 may be provided with an adhesive having a greater degree of tackiness for use in open-air environments, such as for use on the windshield of an open boat. In such circumstances, the greater degree of tackiness will ensure that the stick-on shade is not easily blown off the windows by the wind. For such uses, it is believed that adhesives having a greater degree of tackiness will be preferable, such as the adhesives typically used on POST-IT Super Sticky Notes by 3M.

Referring to FIG. 2, the stick-on shade 10 may include a release sheet 19 for covering adhesive 15 prior to use. The release sheet 19 may take the form of any one of a number of commercially available release sheets that are typically coated with silicone. Prior to use, the user simply peels the adhesive release sheet 19 off of the flexible film 11 and then adheres film 11 to a selected portion of a window to reduce glare from any source, such as the sun.

Referring to FIG. 3, the flexible film 10 may also be provided with stiffening means for resiliently biasing the flexible film 11 to adopt a planar or flat condition while still allowing the film to bead and conform to the shape of the window surface. In the embodiment shown in FIG. 3, the stiffening means comprises a thin, resilient wire 20 that extends along edges 11a, 11b and 11c of flexible film 11. As shown, the thin wire 20 is embedded in the adhesive 15 to adhere wire 20 to film 11. Preferably, the wire 20 is prestressed to adopt a planar or flat condition so that it will correspondingly maintain film 11 in a planar or flat condition. While wire 20 may extend along the sides of film 11 as shown in FIG. 3, it will be understood that the wire or other stiffening means may also be disposed on other areas of the film in accordance with the present invention.

FIG. 4 illustrates a pad 21 of a plurality of individual sheets 22 of stick-on light shades 10 of the present invention. Pad 21 comprises a plurality of such individual sheets 22, which may number between 10 and 200 for most convenient packaging, successively stacked one on top of each other. Pad 21 is very convenient in that users may keep the pad 21 of stick-on light shades 10 of the present invention in a vehicle such as an automobile or airplane and selectively use the individual stick-on light shades 10 as desired to reduce the transmission of light into the vehicle. In the embodiment shown in FIG. 4, the stick-on means is interposed between each of the successive sheets 22 for temporarily and releasably adhering the sheets 22 together in the pad 21 and also for temporarily and releasably adhering the sheets, once removed from the pad, to a selected portion of a window. In the embodiment shown in FIG. 4, the stick-on means comprises an adhesive 15 as shown by the upturned corner of the top sheet.

FIG. 5 illustrates an alternate embodiment of the pad 21' comprised of a plurality of an alternate embodiment of sheets 22' comprised of flexible film 11'. The sheets 22' of flexible film 11' comprise an alternate embodiment of the sun shades 10' of the present invention. In the embodiment shown in FIG. 5, the flexible sheets 11' have static adhesion properties sufficient to temporarily and releasably adhere the sheets 22' to each other and to a window surface. In order to achieve such results, the flexible film 11' is preferably comprised of a material having sufficient electrostatic properties to allow the material to temporarily but sufficiently adhere the film 11' to a window surface. Such flexible film 11' preferably comprises a thermoplastic polymeric film and may comprise homopolymers or copolymers of ethylenically unsaturated monomers such as polyvinyl alcohol or polyvinyl chloride but to name a few preferred materials. However, it will be understood that other suitable films having properties sufficient to electrostatically bond the film 11 to a window surface may also be used in the present invention. In use, the electrostatic nature of the sheets 22' of film 11' cause each of the individual sheets 22' to bond to each other in pad 21' and to bond to a window surface when applied thereto. If necessary, a binding 28 may be affixed along one or more of the peripheral edges of the sheets 22 in order to hold the sheets in a pad form until removed.

FIG. 6 illustrates an example of using the stick-on light shade 10 of the present invention. In particular, FIG. 6 shows a driver 23 in an automobile 24 having a windshield 25. The driver 23 identifies a selected portion 25a of the window or windshield 25 that has unwanted glare from the sun 26. Significantly in the example given, the selected portion 25a of window 25 that exhibits unwanted glare from the sun 26 is not coverable with conventional opaque visors 27. Accordingly, the driver 23 identifies a selected portion 25a of the window 25 exhibiting unwanted glare and then obtains one of the light shades 10 of the present invention. Advantageously, the driver 23 may obtain the light shade 10 from a pad of light shades such as shown in FIGS. 4 and 5. The driver 23 then presses the light shade 10 against the selected portion 25a of the windshield 25 to reduce unwanted glare from the sun. As previously discussed, light shade 10 is comprised of a tinted material that is substantially non-opaque such that the driver can still see through light shade 10, but the shade is substantially and homogeneously tinted to uniformly reduce the transmission of unwanted glare through the light shade 10 and to the driver 23.

While the foregoing specification embodiments of the invention have been disclosed in considerable detail for purposes of illustration, it will be understood that many of these details may be varied without departing from the spirit and scope of the invention.

I claim:

1. A pad of stick-on light shades for each being temporarily and releasably adhered to a window, the window having a height and width, to reduce light transmission through a selected portion of the window, said pad comprising:

a plurality of sheets of substantially non-opaque flexible polymeric film successively stacked together to form said pad;

each of said successive sheets having a top surface, a bottom surface, a peripheral edge, and a height and width;

each of said sheets including tinting means for uniformly reducing transmission of light through each of said sheets; and stick on means interposed between each of said successive sheets for temporarily and releasably adhering said successive sheets, once removed from said pad, to a selected portion of the window.

2. The pad of claim 1 in which each of said successive sheets further includes stiffening means for resiliently maintaining each of said successive sheets in a planar condition.

3. The pad of claim 2 in which said stiffening means comprises a resilient wire extending along at least a portion of said peripheral edge of each of said successive sheets.

4. The pad of claim 1 in which each of said successive sheets reduces light transmission therethrough by about 50% to 80%.

5. The pad of claim 1 in which each of said successive sheets comprises a flexible optical grade film.

6. The pad of claim 1 in which the height and width of each of said successive sheets is less than the height and width of the window.

7. The pad of claim 1 in which said stick-on means comprises an adhesive.

8. The pad of claim 7 in which each of said successive sheets comprises a quadrangle having four sides with said adhesive extending completely along one side of each of said successive sheets and said adhesive extending partially along two generally parallel sides of each of said successive sheets, said two generally parallel sides being generally perpendicular to said one side.

9. The pad of claim 1 in which said adhesive substantially adheres to each of said sheets when said sheets are removed from said pad, such that substantially no adhesive residue remains on a sheet underlying the removed sheet.

10. The pad of claim 1 in which said stick-on means comprises said flexible film having static adhesion properties sufficient to temporarily and releasably adhere said sheets to each other and to a window surface.

11. The pad of claim 1 in which said sheets comprise an ethyl-enically unsaturated monomer.

12. The pad of claim 1 in which said pad includes an adhesive binding along at least one edge.

13. A method of temporarily tinting a selected portion of a window to reduce transmission of light through said selected portion of said window, said method comprising the steps of:

provide a window substrate;

identifying a selected portion of said window substrate for tinting;

obtaining a sheet of flexible polymeric film being homogeneously tinted for uniformly reducing transmission of light therethrough, said step of obtaining said sheet of flexible polymeric film comprises removing an individual sheet of flexible polymeric film from a pad comprising a plurality of sheets of said flexible film successively stacked together; and pressing said sheet of flexible polymeric film against said selected portion of said window substrate such that said sheet adheres to said window substrate and uniformly reduces transmission of light through said selected portion of said window.

14. The method of claim 13 in which said step of pressing said sheet against said selected portion of said window comprises bringing a stick-on means of said sheet into contact with said window.

15. The method of claim 13 in which stick-on means comprises an adhesive.

16. The method of claim 13 in which said stick-on means comprises said flexible film having static adhesion properties sufficient to temporarily and releasably adhere said flexible film to said window.

17. A stick-on light shade for being temporarily and releasably adhered to a window to reduce light transmission through a selected portion of the window, said light shade comprising:

a substantially non-opaque flexible polymeric film having a top surface, a bottom surface and a peripheral edge, said flexible film being substantially and homogeneously tinted to uniformly reduce transmission of light therethrough;

a stiffening means for resiliently maintaining said flexible film in a planar condition; and stick-on means for temporarily and releasably adhering said flexible film to a selected portion of the window and permitting easy removal and selected reattachment of said flexible film to the window; said stiffening means comprises a resilient wire having two ends and extending along at least a portion of said peripheral edge of said flexible film;

said flexible film comprises a quadrangle having four sides with said resilient wire extending completely along one side of said flexible film and said resilient wire extending at least partially along two generally parallel sides of said flexible film, said two generally parallel sides being generally perpendicular to said one side, said ends being located along a respective parallel side.

18. The light shade of claim 17 in which said resilient wire is sufficiently thin whereby a person's view through said flexible film is not materially obstructed.

19. The light shade of claim 17 in which said stick-on means comprises an adhesive that extends along at least a portion of said peripheral edge of said film.

20. A stick-on light shade for being temporarily and releasably adhered to a window to reduce light transmission through a selected portion of the window, said light shade comprising:

a substantially non-opaque flexible polymeric film having a top surface, a bottom surface and a peripheral edge and comprising a quadrangle having four sides, said flexible film being substantially and homogeneously tinted to uniformly reduce transmission of light therethrough; and an adhesive for temporarily and releasably adhering said flexible film to a selected portion of the window and permitting easy removal and selected reattachment of said flexible film to the window, said adhesive extending completely along one side of said flexible film and said adhesive extending partially along two generally parallel sides of said flexible film, said two generally parallel sides a remainder of said two parallel sides having no adhesive thereon being generally perpendicular to said one side.

21. The light shade of claim 20 in which said adhesive has a stronger affinity for said flexible film than for the window.

22. The light shade of claim 20 in which said flexible film is attached to a removable release sheet which is removable prior to use of said light shade.

* * * * *

UNITED STATES PATENT AND TRADEMARK OFFICE
CERTIFICATE OF CORRECTION

PATENT NO. : 5,829,507
DATED : November 3, 1998
INVENTOR(S) : Mark Pawlowski

It is certified that error appears in the above-identified patent and that said Letters Patent is hereby corrected as shown below:

Column 4, line 10 change "band" to --bands--.
         line 10 change "extends" to --extend--.

Claim 20, line 36 delete "a remainder of said two parallel sides having no adhesive thereon".

Claim 20, line 38 insert after "side" --a remainder of said two parallel sides having no adhesive thereon--.

Signed and Sealed this

Twenty-second Day of June, 1999

Attest:

Q. TODD DICKINSON

*Attesting Officer*      *Acting Commissioner of Patents and Trademarks*